Patented July 14, 1942

2,289,414

UNITED STATES PATENT OFFICE 2,289,414

AZO DYE AND COLORATION OF CELLULOSE DERIVATIVES THEREWITH

George Holland Ellis, Henry Charles Olpin, and John Wright, Spondon, near Derby, England, assignors to Celanese Corporation of America, a corporation of Delaware No Drawing. Application December 20, 1939, Serial No. 310,177. In Great Britain December 31, 1938

10 Claims. (Cl. 8—48)

This invention relates to the manufacture of new amino-azo compounds and the production therefrom of azo dyes suitable for the coloring of cellulose ester or ether textile or other products.

According to the present invention valuable amino-azo compounds are obtained by coupling diazo compounds, particularly diazo compounds of the benzene or naphthalene series, with primary aromatic amines of the benzene series which contain an acidyl-amino group and couple in para position to the primary amino group. Preferably both components are free from sulphonic and carboxylic groups.

The amino-azo compounds are thus aryl-azo anilines containing acidyl-amino groups in the aniline nuclei. Aryl-azo-anilines of this type are of particular value for conversion into azo dyes by diazotising them and coupling the diazo compounds with coupling components, especially amine components which couple in para position to an amino group. The new azo dyes so obtained are of great value for the production of colored cellulose ester or ether textile or other products. The colors of these dyes are, as compared with those of analogous dyes which do not contain the acidyl-amino group, displaced towards the green end of the color series extending from yellow to green through orange, red, violet and blue.

The new azo dyes are of special value when formed on cellulose ester or ether textile materials. With their aid it is possible to produce a series of valuable dyeings, including dyeings of very desirable greenish navy blue shades which are dischargeable and have very good fastness to light and washing. The dyes can also be produced in substance, in which form they can be employed for the coloration of cellulose ester or ether solutions. These colored solutions can be spun into colored cellulose ester or ether filaments having the valuable properties of cellulose ester or ether filaments colored by forming the dyes thereon.

The invention includes both the aryl-azo anilines containing acidyl-amino groups in the aniline nuclei, and the azo dyes obtainable by diazotising the aryl-azo anilines and coupling them with coupling components. It also includes the processes of making these aryl-azo anilines and the azo dyes.

For the production of the aryl-azo anilines containing acidyl-amino groups in the aniline nuclei, various primary amines containing nuclear acidyl-amino groups and which couple in para position to the primary amino group can be employed. Compounds in which the acidylamino group is in meta position to the primary amino group and particularly if an alkoxy group or a hydroxy-alkoxy group is in para position to the acidyl-amino group, are especially useful. Preferably the acidyl group is the acidyl radicle of acetic acid or other fatty acid containing less than 5 carbon atoms. However, the acidyl group may be of a different type, for example an aromatic-acidyl group such as benzoyl or other acidyl group of an aromatic mono-carboxylic acid. The acidyl-amino group may be either an acidyl primary amino group, e. g. acetyl-amino or an acidyl secondary amino group, e. g. acetyl methyl-amino group. Examples of suitable p-coupling amines containing acidylamino groups are mono-acetyl-m-phenylene diamine, 2-amino-4 - acetyl-amino-toluene, 2 - amino - 4 - acetylamino-anisole or phenetole, 2-amino-4-acetylamino-1-β-hydroxy-ethoxy-benzene, 2-amino-4-methyl-1-acetyl-amino-benzene, monobenzoyl-m-phenylene diamine, and 1-amino-3-acetylmethylamino-benzene.

A wide range of diazo components may be employed for diazotising and coupling with the amines containing acidyl-amino groups: for example aniline, toluidines, anisidines, phenetidines, α-naphthylamine, and their halogen, nitro, and halogen-nitro derivatives may be employed. Especially valuable products are obtained by using as diazo components α-naphthylamine, o, m or p-nitro-aniline or their nuclear substitution products, particularly such as are free from further nitro, halogen and other negative substituents. Examples of such nuclear substituted nitro-anilines are 4-nitro-2-methoxy-aniline and 4-nitro-2-methyl-aniline. By reducing to an amino group a nitro group of such of the arylazo-anilines as contain nitro groups, azo compounds containing more than one diazotisable amino group can be obtained.

Special mention may be made of the aryl-azo anilines of the general formula

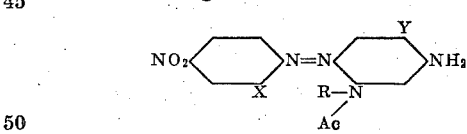

wherein X and Y are hydrogen, alkyl, alkoxy including hydroxy-alkoxy, R is hydrogen or alkyl and Ac is an acidyl group of a fatty acid containing less than 5 carbon atoms.

These compounds can be obtained in the manner indicated above, namely by coupling the appropriate 4-nitro-aniline with the appropriate m-acidyl-amino-substituted-aniline.

As mentioned above, aryl-azo anilines containing acidyl-amino groups in the aniline nuclei can be converted into valuable azo dyes by diazotising and coupling with coupling components, especially amine coupling components which couple in para position to an amino group. As examples of suitable amine coupling components may be mentioned the N-alkyl and N-hydroxyalkyl derivatives of aniline and α-naphthylamine (particularly the N-disubstituted derivatives) and such nuclear substitution products of these compounds as couple in the para position to the substituted-amino group. Special mention may be made of the hydroxy-alkyl-amino coupling components referred to in co-pending U. S. application S. No. 182,166 filed December 28, 1937, now Patent No. 2,196,984 of April 16, 1940, and the mono-acidyl-m-phenylene diamine coupling coupling components mentioned in U. S. application S. No. 310,176 filed December 20, 1939.

Specific examples of coupling components which may be employed are N-ethyl-β-hydroxy-ethyl aniline, N-di(β-hydroxy-ethyl)-aniline, N-ethyl-β-hydroxyethyl-m-toluidine, N-di(β-hydroxy-ethyl)-m-toluidine, 3-acetylamino-1-dimethylamino-benzene, 3-acetylamino-1-diethylamino-benzene, 3-acetylamino-1-N-ethyl-β-hydroxyethyl-amino-benzene, 3-acetyl-amino-1-di-(β-hydroxy-ethyl)-amino-benzene, N-dimethyl-m-toluidine, and N-diethyl-m-toluidine. It will be noted that these coupling components include amines of which the amino groups carry one or two unsubstituted alkyl groups as substituents and also amines consisting of m-toluidine substituted in this way. All yield valuable dyes and the m-toluidine derivatives are particularly useful by reason of the ease with which they couple with diazo compounds, an important consideration when forming azo dyes on textile materials. For instance valuable navy blue shades which are dischargeable and of very good fastness to light and washing are obtained by coupling N-di-(β-hydroxy-ethyl)-m-toluidine, N-diethyl-m-toluidine, or 3-acetylamino-1-diethylamino-benzene on cellulose acetate material with the diazo compound of an aryl-azo aniline obtainable by coupling 2-amino-4-acetylamino-anisole with diazotised p-nitraniline, 4-nitro-2-methoxy-aniline, m-nitraniline, o-nitraniline, 4-chlor-3-nitraniline, or α-naphthylamine. Again a navy blue shade can be obtained by using the amino-aryl-azo-aniline obtainable by coupling diazotised p-nitraniline with 2-amino-4-acetylamino-anisole and reducing the nitro group to an amino group. In general the aryl-azo anilines containing the acidylamino group in meta-position to the diazotisable amino group and an alkoxy or hydroxy-alkoxy group in para position to the acidyl-amino group yield with the amine coupling components shades more inclined to green than the corresponding aryl-azo anilines which do not contain the alkoxy or hydroxy-alkoxy group.

Other coupling components which can be used for the production of azo dyes by coupling with the diazotised aryl-azo-anilines are 3-acetyl-amino-6-methyl-di-(β-hydroxy-ethyl) aniline, 3-acetylamino-6-methoxy-di-(β-hydroxy-ethyl) aniline, 3-acetylamino-6-β-hydroxy-ethoxy-di-(β-hydroxy-ethyl) aniline, 3-methyl-6-methoxy-1-diethylamino-benzene, 3:6-dimethoxy-1-diethylamino-benzene and 3:6-dimethyl-1-diethylamino benzene. These coupling components are suitable for the production of dyes in substance.

As regards the procedure to be followed in forming the dyes on cellulose ester or ether materials, it is preferred to incorporate in the material the aryl-azo aniline containing an acidylamino group and then to effect diazotisation and coupling component in a separate bath.

The aryl-azo anilines can be applied to cellulose etster or ether materials in the form of aqueous dispersions. Bath methods may be employed, that is to say methods in which the materials are allowed to absorb the aryl-azo aniline component from an aqueous dispersion of the latter in which they are immersed. Again, mechanical impregnation methods may be used, the materials being impregnated with a quantity of liquid containing the requisite proportion of the aryl-azo aniline. To this end padding or printing methods may be utilised. The mechanically impregnated material may then be aged or steamed to cause the aryl-azo aniline to enter the cellulose ester or ether material.

The aryl-azo anilines of the present invention have substantive affinity for cellulose esters or ethers but in general substantially no affinity for cellulose. If, therefore, such an aryl-azo aniline is applied to mixed materials containing both cellulose, e. g. cotton or regenerated cellulose, and a cellulose ester or ether, the latter alone takes up the aryl-azo aniline, so that on diazotising and coupling with the coupling component the cellulose component of the material remains uncolored. By suitably coloring the cellulose component of such mixed material with dyestuffs resisting the cellulose ester or ether component of the materials solid shades or two color effects can readily be obtained according to the components and dyes selected. The dyestuff for the cellulose portion can be applied before or after the development of the azo dye on the cellulose ester or ether portion. If applied before development of the azo dyes it may be applied either together with or separately from the aryl-azo aniline applied to the cellulose ester or ether portion. If the dyestuff for the cellulose component is diazotisable it can be diazotised and developed with a suitable coupling component at any convenient stage of the operation. Further, if desired, the coupling component employed in accordance with the present invention for the formation of an azo dye on the cellulose ester or ether component of the material may simultaneously be used to develop the diazotised dyestuff on the cellulose component of the mixed material.

The dyeings produced on cellulose ester or ether materials with the aid of the aryl-azo anilines containing acidyl-amino groups in accordance with the invention, may be topped with other dyes and particularly with dyes having direct affinity for the cellulose ester or ether. For example a navy blue shade may be topped with an orange dye or with both a red dye and a yellow dye in order to produce a very dark navy or a black shade. Again, a light or medium shade of blue produced in accordance with the invention may be topped to produce a wide range of dark shades such as browns, bottle greens, deep wine, and so on. Providing the dyeing produced in accordance with the present invention is not too heavy and dischargeable topping colors are employed, dischargeable compound shades can be obtained.

If desired, instead of applying the topping colors after the formation of the dye on the material in accordance with the invention, the said topping colors may be applied prior to the coupling operation, for instance they may be applied to the material together with the arylazo aniline. In this way some economy of time and materials may often be secured.

Though the dyeings produced in accordance with the invention can be topped with other dyes for the production of compound shades, it is a merit of dyes of the present invention that they can be formed on cellulose ester or ether materials so as to produce navy blue shades of commercially desirable hue directly and without recourse to a topping operation.

As mentioned above the new dyes can also be produced in substance. In this form they can be employed for coloring cellulose ester or ether materials by direct dyeing methods though, in general, this method of coloring such materials is less advantageous than the method of forming the dyes on the fibre as described above. When formed in substance the dyes are of particular value for coloring cellulose ester or ether solutions, especially lacquers and spinning solutions. By shaping and setting such solutions in the form of filaments, straws, films and the like valuable colored products can be produced. For example, colored cellulose acetate filaments can be produced by dry spinning such colored solutions. The colored products so obtained by spinning methods can be topped with suitable direct dyeing dyes or mixture of dyes in order to produce a wide range of deep shades. For this purpose it is particularly advantageous to spin filaments containing a proportion of dye such that the product is of a blue shade. A single product of this kind can, by suitable choice of topping color, be caused to yield a very large number of commercial desirable shades.

The invention is particularly concerned with the production of colored cellulose acetate products. The new dyes may, however, be used for the production of colored products of other cellulose ester, for example cellulose formate, propionate, butyrate or acetate-butyrate, or of cellulose ethers, for example methyl, ethyl, or benzyl cellulose.

The invention is illustrated by the following examples:

*Example 1*

13.8 parts of p-nitraniline are diazotised in the usual manner with sodium nitrite and hydrochloric acid and the diazo solution thus obtained is allowed to run into a solution made by dissolving 18 parts 2-amino-4-acetylamino-anisole in 10 parts of concentrated hydrochloric acid and 200 parts water and making the liquid up to 1500 parts with water. After addition of the diazo solution the liquid is stirred overnight and the product filtered off, neutralised and milled in water to a state of fine sub-division.

*Example 2*

5 parts of a finely milled 10% aqueous paste of the 4-nitro-benzene-azo-4'-amino-3'-methoxy-6'-acetylamino benzene, obtained in the manner described in Example 1, is dispersed in 3000 parts of water with the aid of soap and Turkey red oil. 100 parts of cellulose acetate fabric is dyed in this bath at 78 to 80° C. for about 2 hours. The material is then removed from the bath, rinsed and diazotised for 30 minutes at ordinary temperature in a 30:1 bath prepared with 20 parts of concentrated hydrochloric acid and 5 parts of sodium nitrite. The diazotised material is then rinsed and entered into a cold 30:1 coupling bath containing 1 part of 3-acetylamino-1-diethylamino-benzene dispersed with 10 parts of Turkey red oil. After working for a short time cold the temperature is raised to 60° C. which is maintained for half an hour. The material is then rinsed and soaped for half an hour at 60° C. in a solution containing 0.25 gram per litre of soap. A greenish navy blue shade of excellent fastness properties is thus obtained; it can readily be discharged with soluble zinc formaldehyde sulphoxylate.

Analogous results are obtained using 3-acetylamino-1-di-(β-hydroxyethyl-amino benzene in place of 3-acetylamino-1-diethylamino-benzene.

By substituting 2 parts of N-di-(β-hydroxyethyl)-m-toluidine for the 1 part of 3-acetylamino-1-diethylamino-benzene a navy blue shade which is less green is obtained. In this case it is advisable to enter the diazotised material into the coupling bath at 60° C. and maintain at this temperature for half an hour. Again N-dimethyl-m-toluidine can be used as coupling component.

*Example 3*

100 parts of a cellulose acetate/viscose knitted fabric consisting of approximately 66% and 33% of each fibre respectively, is dyed from a bath containing 6.6 parts of a 10% paste of 4-nitro-4'-amino-3'-methoxy-6'-acetylamino-azo - benzene and 1 part of Diazo Fast Green GL.

Dyeing is carried out at 75–80° C. in a 30:1 bath for 1½ hours, an addition of 3 parts of Glauber's salt being made after 15 minutes at the dyeing temperature. The fabric is then rinsed and diazotised for ½ hour at 10–20° C. in a 30:1 bath containing 5 parts of sodium nitrite and 20 parts of hydrochloric acid.

After diazotising, the fabric is rinsed off and introduced into a 30:1 bath containing 2 parts of m-acetylamino-diethyl aniline dispersed with five times its weight of Turkey red oil. The initial temperature of the coupling bath is 20° C., this being raised to 60° C. in 15 minutes and maintained at this temperature for ¾ hour. The pattern is then washed off and soaped in a 1 g. p. l. soap solution at 60° C. for 20 minutes in a 30:1 bath.

The cellulose acetate is dyed to a desirable greenish navy blue shade and the viscose a full green shade. By using instead of Diazo Fast Green GL, Diazo Brilliant Scarlet BAL and di-(β-hydroxy)-ethyl-m-toluidine instead of m-acetylamino-diethylaniline, there is obtained a fabric in which the cellulose acetate is dyed a navy blue shade and the viscose a bright scarlet.

*Example 4*

A fine suspension of 38.9 parts of 4-nitro-4'-amino-3'-methoxy-6'-acetylamino-azo - benzene in 189 parts of acetic acid is added slowly to a stirred solution of nitrosyl sulphuric acid prepared by warming for a short time to 80° C. 7.2 parts of sodium nitrite in 132 parts of 96% sulphuric acid. The temperature is maintained at 10–15° C. during the addition of the base and for 1½ hours after. 2 parts of sulphamic acid are added and the filtered diazo solution introduced dropwise into a stirred solution of 20.7 parts of m-acetylamino-diethyl-aniline in 18.2 parts of hydrochloric acid and 2,650 parts of 10% sodium acetate solution. After stirring for a further ½ hour the product is filtered, washed with water and dried at 60° C. It is suitable for incorporation in a cellulose acetate spinning solution.

Analogous results are obtained using instead of the m-acetylamino-diethyl-aniline, di-(β-hydroxy-ethyl)-m-toluidine, dimethyl-m-toluidine, 3-methyl-6-methoxy-1-diethylamino benzene or 3,6-dimethyl-1-diethylamino-benzene.

Having described our invention, what we desire to secure by Letters Patent is:

1. Process for the preparation of an azo dye, which comprises coupling a diazotized amino-azo compound of the general formula:

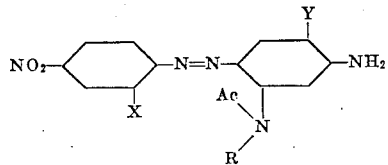

wherein X and Y are selected from the group consisting of hydrogen, alkyl and alkoxy, R is selected from the group consisting of hydrogen and alkyl and Ac is an acidyl group of a fatty acid containing less than five carbon atoms, with a dialkylaniline having an alkyl group in the meta position to the dialkylamino group and capable of coupling in the para position to the dialkylamino group.

2. Process for the preparation of an azo dye, which comprises coupling 4-nitro-4'-amino-3'-methoxy-6'-acetylamino-azo-benzene with a dialkyl aniline having an alkyl group in the meta position to the dialkylamino group, the alkyl groups being unsubstituted.

3. An azo dye of the general formula:

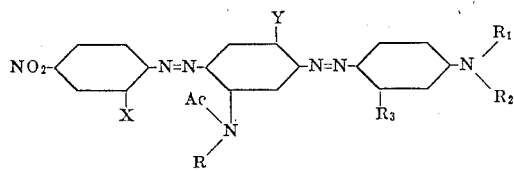

wherein X and Y are selected from the group consisting of hydrogen, alkyl and alkoxy, R is selected from the group consisting of hydrogen and alkyl, Ac is an acidyl group of a fatty acid containing less than five carbon atoms and $R_1$, $R_2$ and $R_3$ are alkyl radicles.

4. An azo dye of the general formula:

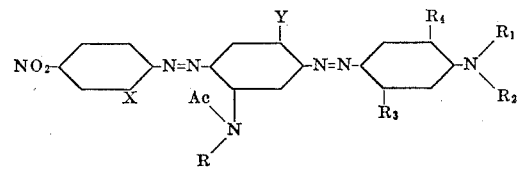

wherein X and Y are selected from the group consisting of hydrogen, alkyl and alkoxy, R is selected from the group consisting of hydrogen and alkyl, Ac is an acidyl group of a fatty acid containing less than five carbon atoms, $R_1$ and $R_2$ are selected from the group consisting of alkyl and hydroxyalkyl, $R_3$ is alkyl and $R_4$ is selected from the group consisting of alkyl, alkoxy and hydroxyalkoxy.

5. An azo dye of the general formula:

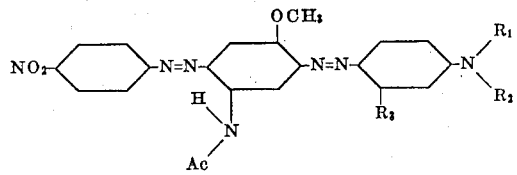

wherein Ac is an acetyl radicle, and $R_1$, $R_2$ and $R_3$ are alkyl radicles.

6. Process for the coloration of cellulose ester or ether materials, which comprises coupling thereon a diazotized amino-azo compound of the general formula:

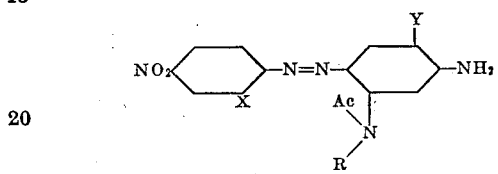

wherein X and Y are selected from the group consisting of hydrogen, alkyl and alkoxy, R is selected from the group consisting of hydrogen and alkyl and Ac is an acidyl group of a fatty acid containing less than five carbon atoms, with a dialkylaniline containing an alkyl group in the meta position to the dialkylamino group and capable of coupling in the para position to the dialkylamino group.

7. Process for the coloration of cellulose ester or ether materials, which comprises coupling thereon 4-nitro-4'-amino-3-methoxy-6'-acetylamino-azo-benzene with a dialkylaniline containing an alkyl group in the meta position to the dialkylamino group, the alkyl groups being unsubstituted.

8. Cellulose ester or ether materials colored with a dyestuff of the general formula:

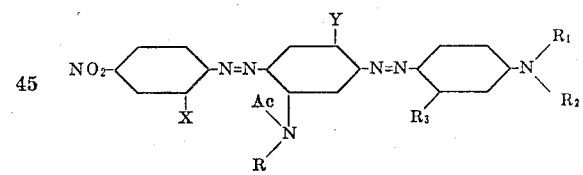

wherein X and Y are selected from the group consisting of hydrogen, alkyl and alkoxy, R is selected from the group consisting of hydrogen and alkyl, Ac is an acidyl group of a fatty acid containing less than five carbon atoms and $R_1$, $R_2$ and $R_3$ are alkyl radicles.

9. Cellulose ester or ether materials colored with a dyestuff of the general formula:

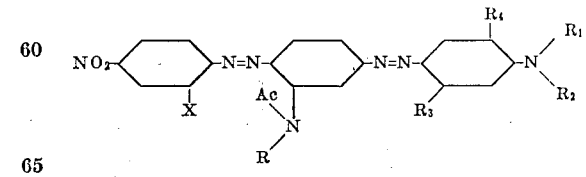

wherein X and Y are selected from the group consisting of hydrogen, alkyl and alkoxy, R is selected from the group consisting of hydrogen and alkyl, Ac is an acidyl group of a fatty acid containing less than five carbon atoms, $R_1$ and $R_2$ are selected from the group consisting of alkyl and hydroxyalkyl, $R_3$ is alkyl and $R_4$ is selected from the group consisting of alkyl, alkoxy and hydroxyalkoxy.

10. Cellulose ester or ether materials colored with a dyestuff of the general formula:
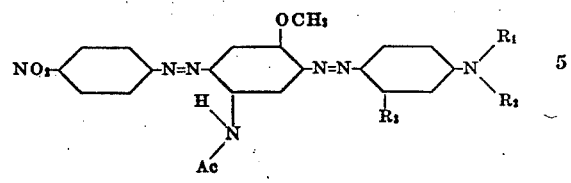
wherein Ac is an acetyl radicle, and $R_1$, $R_2$ and $R_3$ are alkyl radicles.
GEORGE HOLLAND ELLIS.
HENRY CHARLES OLPIN.
JOHN WRIGHT.

CERTIFICATE OF CORRECTION.

Patent No. 2,289,414. July 14, 1942.

GEORGE HOLLAND ELLIS, ET AL.

It is hereby certified that error appears in the printed specification of the above numbered patent requiring correction as follows: Page 2, first column, line 21, strike out the word "coupling" after "diamine"; and second column, line 9, before "coupling" insert --coupling with the--; line 11, for "etster" read --ester--; and that the said Letters Patent should be read with this correction therein that the same may conform to the record of the case in the Patent Office.

Signed and sealed this 25th day of August, A. D. 1942.

(Seal)

Henry Van Arsdale,
Acting Commissioner of Patents.